US012585174B2

(12) United States Patent
Kanayama et al.

(10) Patent No.: US 12,585,174 B2
(45) Date of Patent: Mar. 24, 2026

(54) DIGITAL PROJECTOR, MACHINE TOOL, AND PROJECTED IMAGE DISPLAY METHOD

(71) Applicants: AMADA CO., LTD., Kanagawa (JP); AMADA MACHINERY CO., LTD., Kanagawa (JP)

(72) Inventors: Masahiro Kanayama, Kanagawa (JP); Fumihiko Matsubara, Kanagawa (JP); Yoshihiro Tsunekawa, Kanagawa (JP)

(73) Assignees: AMADA CO., LTD., Kanagawa (JP); AMADA MACHINERY CO., LTD., Kanagawa (JP)

( * ) Notice: Subject to any disclaimer, the term of this patent is extended or adjusted under 35 U.S.C. 154(b) by 224 days.

(21) Appl. No.: 18/281,228

(22) PCT Filed: Jan. 11, 2022

(86) PCT No.: PCT/JP2022/000600
§ 371 (c)(1),
(2) Date: Sep. 8, 2023

(87) PCT Pub. No.: WO2022/196050
PCT Pub. Date: Sep. 22, 2022

(65) Prior Publication Data
US 2024/0152038 A1 May 9, 2024

(30) Foreign Application Priority Data
Mar. 17, 2021 (JP) ................................. 2021-044047

(51) Int. Cl.
*G03B 17/54* (2021.01)
*G03B 5/00* (2021.01)

(52) U.S. Cl.
CPC ............... *G03B 17/54* (2013.01); *G03B 5/00* (2013.01)

(58) Field of Classification Search
CPC .......... G03B 17/54; G03B 5/00; G03B 19/22; B24B 17/04; B23Q 17/24
See application file for complete search history.

(56) References Cited

U.S. PATENT DOCUMENTS 9,582,088 B2 * 2/2017 Kawata .................... H04N 7/18
2004/0239880 A1 * 12/2004 Kapellner ............ H04N 9/3129
348/E9.026

(Continued)

FOREIGN PATENT DOCUMENTS

DE          3905062 A1     8/1990
JP          S62-165106 A   7/1987

(Continued)

OTHER PUBLICATIONS

International Search Report for corresponding Application No. PCT/JP2022/000600, mailed Mar. 29, 2022.

(Continued)

*Primary Examiner* — Twyler L Haskins
*Assistant Examiner* — John H Morehead, III
(74) *Attorney, Agent, or Firm* — Renner, Otto, Boisselle & Sklar, LLP

(57) ABSTRACT

A digital projector according to one aspect includes: a light source that irradiates an object to be machined with light; a low-magnification camera mechanism that captures a projected image of the object to be machined, generated by the irradiation by the light source; a beam splitter provided on a light path of the projected image; a high-magnification camera mechanism that captures the projected image, split by the beam splitter, in a range narrower than the low-magnification camera mechanism and at a magnification higher than the low-magnification camera mechanism; and a display that displays a low-magnification image captured by the low-magnification camera mechanism and a high-magnification image captured by the high-magnification camera (Continued)

mechanism. The high-magnification camera mechanism includes a high-magnification image-forming lens that enlarges the projected image to a predetermined magnification, a high-magnification camera that captures the projected image enlarged, and a high-magnification camera movement mechanism that changes an imaging position of the high-magnification camera with respect to the projected image.

5 Claims, 6 Drawing Sheets

(56) References Cited

U.S. PATENT DOCUMENTS

| | | | | | |
|---|---|---|---|---|---|
| 2007/0273797 | A1* | 11/2007 | Silverstein | ............. | H04N 9/315 |
| | | | | | 348/752 |
| 2009/0080695 | A1* | 3/2009 | Yang | ....................... | G06V 10/92 |
| | | | | | 382/103 |
| 2009/0290132 | A1* | 11/2009 | Shevlin | ............... | G03F 7/70308 |
| | | | | | 353/69 |
| 2016/0223888 | A1* | 8/2016 | Nishikawa | ............. | G02B 13/16 |

| | | | | | |
|---|---|---|---|---|---|
| 2017/0143442 | A1* | 5/2017 | Tesar | ...................... | H04N 23/63 |
| 2018/0067385 | A1* | 3/2018 | Nakada | ................. | G03B 21/208 |
| 2018/0192018 | A1* | 7/2018 | Nakamura | ........... | H04N 9/3188 |
| 2021/0169320 | A1* | 6/2021 | Tripathi | ................. | A61B 3/102 |
| 2021/0169324 | A1* | 6/2021 | Tripathi | .............. | H04N 13/156 |

FOREIGN PATENT DOCUMENTS

| | | | |
|---|---|---|---|
| JP | H0256516 | A | 2/1990 |
| JP | 106-250093 | A | 9/1994 |
| JP | 2001-117018 | A | 4/2001 |
| JP | 2008-105119 | A | 5/2008 |
| JP | 2012-150142 | A | 8/2012 |
| JP | 2014-532188 | A | 12/2014 |
| JP | 2020-059068 | A | 4/2020 |
| WO | 2013/059338 | A1 | 4/2013 |

OTHER PUBLICATIONS

Written Opinion for corresponding Application No. PCT/JP2022/000600, mailed Mar. 29, 2022.
Extended European Search report for corresponding EP Application No. 22770812.0 dated Jul. 22, 2024.

* cited by examiner

DIGITAL PROJECTOR, MACHINE TOOL, AND PROJECTED IMAGE DISPLAY METHOD

TECHNICAL FIELD

The present invention relates to a digital projector, a machine tool, and a projected image display method.

BACKGROUND ART

In the past, an optical profile grinder is known in which an image of a tip shape of a grinding wheel captured by a camera is simultaneously displayed on a display screen displaying a machined shape of an object to be machined (workpiece), and teaching is performed by relatively moving the image of the tip shape of the grinding wheel with respect to the machined shape of the workpiece displayed on the display screen and finding a plurality of positions in contact (Patent Literature 1).

In the optical profile grinder of Patent Literature 1, a zoom icon is displayed on the display screen, and by clicking the zoom icon, the image of the machined shape of the workpiece, the tip shape of the grinding wheel, and the like displayed on the display screen can be enlarged or reduced.

CITATION LIST

Patent Literature

Patent Literature 1: Japanese Patent Application Laid-Open Publication No. 2008-105119.

SUMMARY

In recent years, machined products such as mold parts and tools have become increasingly finer and more accurate, requiring optical profile grinders to perform grinding and workpiece shape measurement in microns. In the optical profile grinder of Patent Literature 1, it is possible to enlarge various images by using the zoom icon, but this is only enlarging a part of the image captured at a low magnification to widen the field of view by image processing. Therefore, even when a high-resolution camera (so-called 4K camera, 8K camera, etc.) available at the time of filing the present application is used to capture the image of the field of view required by a person skilled in the art, it is difficult to perform highly accurate measurement in microns.

In the optical profile grinder of Patent Literature 1, when the magnification of the camera is increased to an extent that measurement is performed in microns, the field of view (imaging range) becomes extremely narrow, and problems may occur which include the following: it is difficult to tell which portion of the workpiece or the grinding wheel is being observed in the image displayed on the display screen; and the image on the display screen changes drastically when the workpiece or the grinding wheel is moved slightly to change the observation portion, and the observation portion is easily lost.

One aspect of the present invention is a digital projector, a machine tool, and a projected image display method capable of performing highly accurate measurement while ensuring a wide field of view.

A digital projector according to one aspect of the present invention is a digital projector including: a light source that irradiates an object to be machined with light; a low-magnification camera mechanism that captures a projected image of the object to be machined, generated by the irradiation by the light source; a beam splitter provided on a light path of the projected image; a high-magnification camera mechanism that captures the projected image, split by the beam splitter, in a range narrower than the low-magnification camera mechanism and at a magnification higher than the low-magnification camera mechanism; and a display that displays a low-magnification image captured by the low-magnification camera mechanism and a high-magnification image captured by the high-magnification camera mechanism. The high-magnification camera mechanism includes a high-magnification image-forming lens that enlarges the projected image to a predetermined magnification, a high-magnification camera that captures the projected image enlarged, and a high-magnification camera movement mechanism that changes an imaging position of the high-magnification camera with respect to the projected image.

Further, a machine tool according to one aspect of the present invention includes such a digital projector.

Moreover, a projected image display method according to one aspect of the present invention is a projected image display method that uses the digital projector described above and includes: irradiating an object to be machined with light; capturing a projected image of the object to be machined, generated by the light irradiation step, with the low-magnification camera mechanism; capturing the projected image, split by the beam splitter, with the high-magnification camera mechanism in a range narrower than the low-magnification camera mechanism and at a magnification higher than the low-magnification camera mechanism; and displaying, on the display, a low-magnification image captured by the low-magnification imaging step and a high-magnification image captured by the high-magnification imaging step.

With a digital projector, a machine tool, and a projected image display method according to one aspect of the present invention, a wide range of a projected image of an object to be machined can be observed using a low-magnification image captured by a low-magnification camera mechanism, and a more pinpoint range in the projected image of the object to be machined can be observed at a higher magnification using a high-magnification image captured by a high-magnification camera mechanism.

According to one aspect of the present invention, it is possible to perform highly accurate measurement while ensuring a wide field of view.

DESCRIPTION OF EMBODIMENT

Hereinafter, a preferred embodiment for carrying out the present invention will be described with reference to the drawings. The following embodiment is not intended to limit the invention according to each claim, and all combinations of features described in the embodiment are not necessarily essential to the solution of the invention. In the present embodiment, the scales and dimensions of the components may be exaggerated, or some of the components may be omitted.

[Overall Configuration of Machine Tool]

Figure 1:
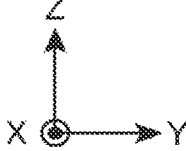
FIG. 1 illustrates a schematic view of an overall configuration of a machine tool according to the present embodiment.

First, the overall configuration of the machine tool according to the present embodiment will be described with reference to FIG. 1. FIG. 1 illustrates a schematic view of an overall configuration of the machine tool according to the present embodiment. In the following description, the machine tool according to the present embodiment will be described as an optical profile grinder. However, the machine tool is not limited thereto, and may be any other machine tool equipped with a digital projector. In the following description, the "X-axis direction" means a direction perpendicular to the paper surface of FIG. 1, the "Z-axis direction" means a vertical direction in FIG. 1, and the "Y-axis direction" means a horizontal direction in FIG. 1.

As illustrated in FIG. 1, an optical profile grinder 1 according to the present embodiment includes: a workpiece holding mechanism 10 that holds a workpiece W as an object to be machined; a grindstone holding mechanism 20 that holds a grindstone 22 for grinding the workpiece W on the workpiece holding mechanism 10; a digital projector 30 that can display the workpiece W in an enlarged manner; and an operation control panel 70 that can input and register various information relating to grinding, and automatically control the optical profile grinder 1 based on a predetermined machining program. Note that the operation control panel 70 according to the present embodiment can adopt various known configurations, and a detailed description thereof will thus be omitted.

As illustrated in FIG. 1, the workpiece holding mechanism 10 includes a workpiece table 12 on which the workpiece W is placed, and an X-axis direction movement mechanism 14, a Y-axis direction movement mechanism 16, and a Z-axis direction movement mechanism 18 that move the workpiece table 12 in the X-axis direction, the Y-axis direction, and the Z-axis direction, respectively, by the operator's operation or automatic control based on a machining program. The X-axis direction movement mechanism 14, the Y-axis direction movement mechanism 16, and the Z-axis direction movement mechanism 18 are provided with respective operation handles (not illustrated) to be operated by the operator, and are configured to move the workpiece W along the X-axis direction, the Y-axis direction, and the Z-axis direction by the operator's operation through the operation handles. Note that the workpiece holding mechanism 10 according to the present embodiment can adopt various known configurations, and a detailed description thereof will thus be omitted.

As illustrated in FIG. 1, the grindstone holding mechanism 20 includes a grindstone head 24 on which the grindstone 22 is rotatably supported, and an X-axis direction movement mechanism 25 and a Y-axis direction movement mechanism 26 that move the grindstone head 24 in the X-axis direction and the Y-axis direction, respectively, by the operator's operation or by automatic control based on a machining program. The grindstone head 24 supports the grindstone 22 so as to be movable along the Z-axis direction, and also functions as a Z-axis direction movement mechanism for the grindstone 22. The X-axis direction movement mechanism 25 is provided with an X-axis handle 27 to be operated by the operator, and is configured to move the grindstone 22 along the X-axis direction by the operator's operation through the X-axis handle 27. The Y-axis direction movement mechanism 26 is provided with a Y-axis handle 28 to be operated by the operator, and is configured to move the grindstone 22 along the Y-axis direction by the operator's operation through the Y-axis handle 28. Note that the grindstone holding mechanism 20 according to the present embodiment can adopt various known configurations, and a detailed description thereof will thus be omitted.

With the above configuration, the optical profile grinder 1 according to the present embodiment is configured to position the workpiece W placed on the workpiece table 12 in the X-axis direction, the Y-axis direction, and the Z-axis direction manually or by automatic control based on a machining program. The optical profile grinder 1 is configured to grind the workpiece W by bringing the grindstone 22, which is rotated at a predetermined rotational frequency, into contact with the workpiece W while moving the grindstone 22 in the X-axis direction, the Y-axis direction, and the Z-axis direction, manually or by automatic control based on a machining program.

[Overall Configuration of Digital Projector]

Figure 2:
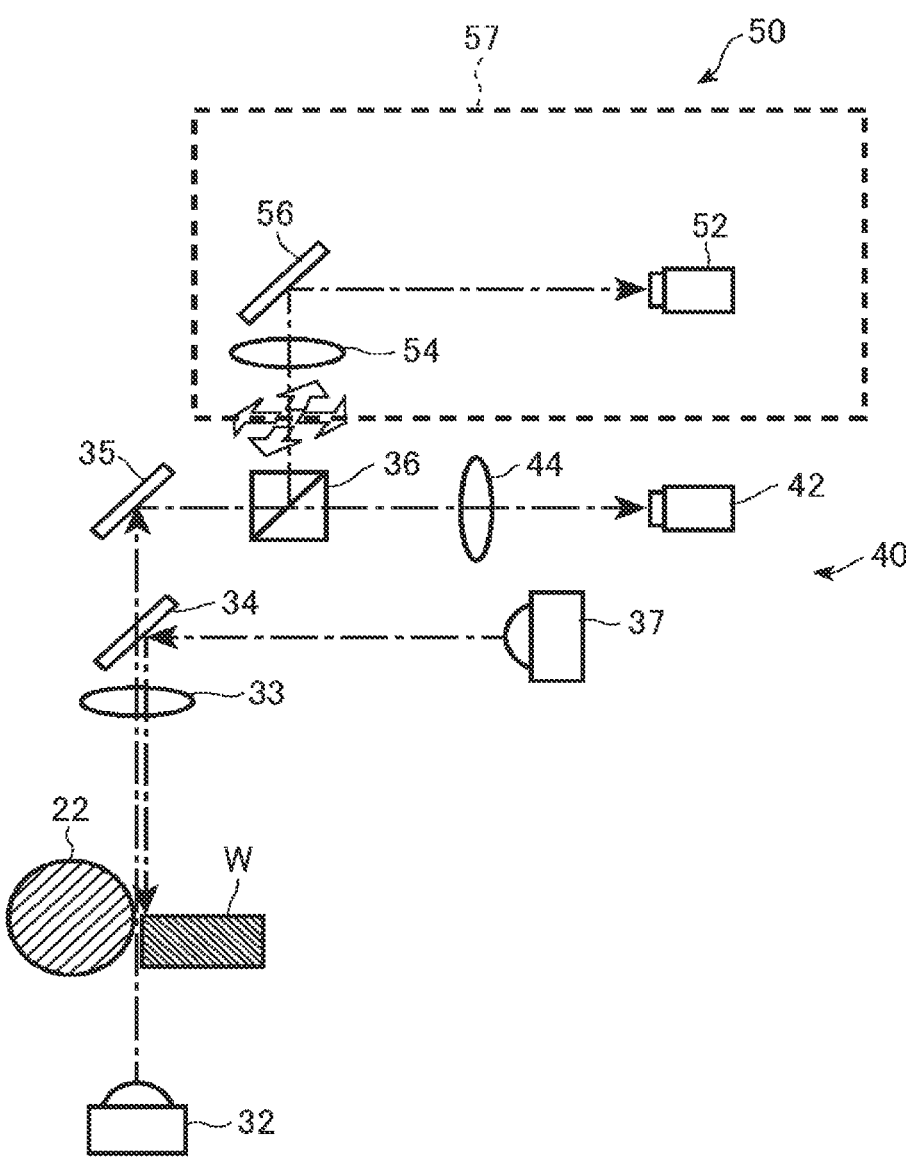
FIG. 2 illustrates a schematic diagram of an optical configuration of a digital projector.
Figure 3:
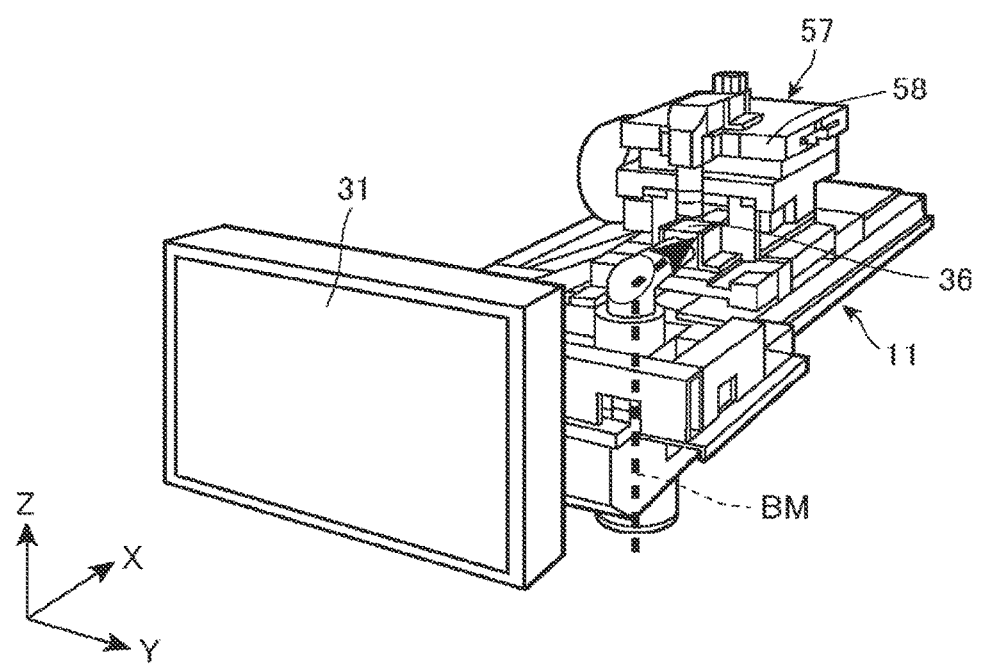
FIG. 3 illustrates a schematic view of a configuration of a high-magnification camera movement mechanism.
Figure 4:
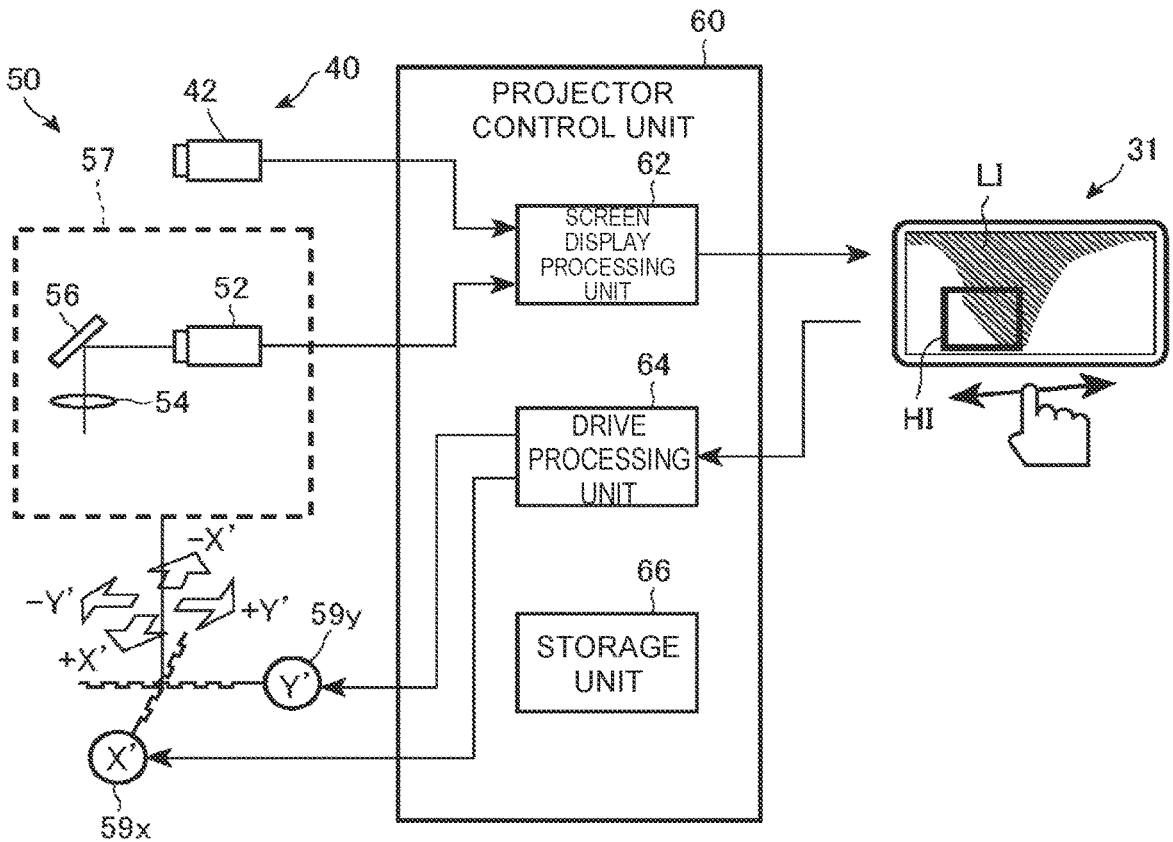
FIG. 4 illustrates a schematic diagram of a system configuration of the digital projector.
Figure 5:
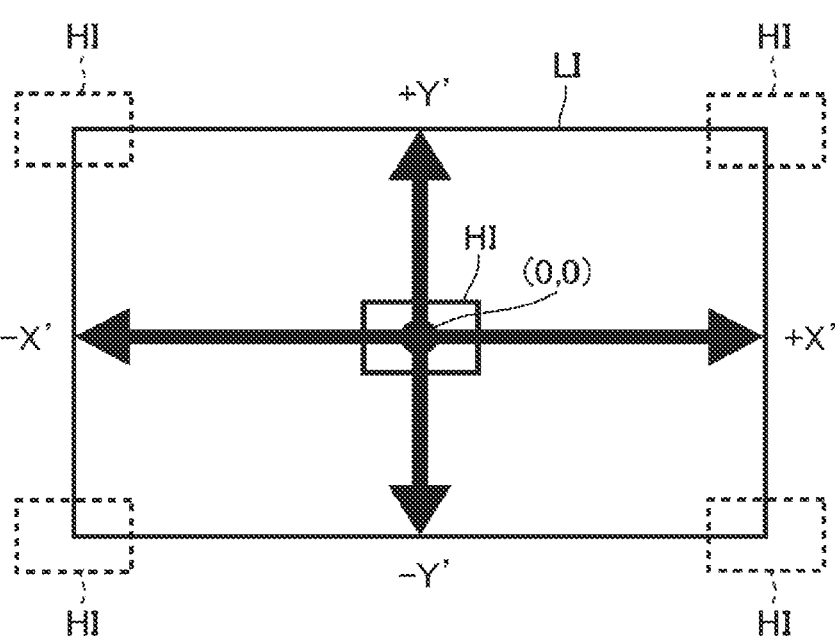
FIG. 5 illustrates a schematic view of a movable range of a high-magnification image with respect to a low-magnification image.

Next, a specific configuration of the digital projector 30 according to the present embodiment will be described with reference to FIGS. 2 to 5. FIG. 2 illustrates a schematic diagram of the optical configuration of the digital projector. FIG. 3 illustrates a schematic view of a configuration of a high-magnification camera movement mechanism. FIG. 4 illustrates a schematic diagram of the system configuration of the digital projector. FIG. 5 illustrates a schematic view of a movable range of a high-magnification image with respect to a low-magnification image.

As illustrated in FIG. 2, the digital projector 30 includes: a main light source 32 (light source), such as a light-emitting diode (LED), that irradiates a subject, which is the workpiece W (object to be machined), with a light beam BM (light); a low-magnification camera mechanism 40 that captures a projected image of the workpiece W generated by the irradiation by the main light source 32; a beam splitter 36 provided on a light path of the projected image; a high-magnification camera mechanism 50 that captures the projected image of the workpiece W, split by the beam splitter 36, in a range narrower than the low-magnification camera mechanism 40 and at a magnification higher than the low-magnification camera mechanism 40; and a display 31 (cf. FIG. 1) that displays a low-magnification image LI captured by the low-magnification camera mechanism 40 and a high-magnification image HI captured by the high-magnification camera mechanism 50. As illustrated in FIG. 4, the digital projector 30 further includes a projector control unit 60 that executes various processes in the digital projector 30. Note that the main light source 32 according to the present embodiment can adopt various known configurations, and a detailed description thereof will thus be omitted.

As illustrated in FIG. 2, the digital projector 30 includes, between the workpiece W and the beam splitter 36, a relay lens 33 and a reflective mirror 35 that transmit a projected image (shadow) of the workpiece W and the grindstone 22 generated by irradiation by the main light source 32 to the beam splitter 36. In the digital projector 30, various lenses (condenser lens group), dustproof glass, and the like may be provided between the main light source 32 and the workpiece W/the grindstone 22 as required. Note that the relay lens 33 may be a lens group made up of a plurality of lenses.

In the present embodiment, the beam splitter 36 is disposed at a position where the projected image of the subject, which is the workpiece W (object to be machined) generated by irradiation by the main light source 32, is formed. The relay lens 33 and the reflective mirror 35 cooperate with each other to form the projected image of the workpiece W and the grindstone 22 in the beam splitter 36. As described above, in the present embodiment, the projected image is formed in the beam splitter 36, whereby an intermediate focus is formed on the light path between the workpiece W (object to be machined) and the low-magnification camera mechanism 40 and/or the high-magnification camera mechanism 50. However, the light path configuration is not limited thereto, and is only required to cause the image of the workpiece W (object to be machined), which is the subject, to be finally formed in each of the low-magnification camera mechanism 40 and the high-magnification camera mechanism 50, and from such a viewpoint, the position where the beam splitter 36 is disposed is not particularly limited as long as the position is closer to the workpiece W (object to be machined) than the low-magnification camera mechanism 40 and the high-magnification camera mechanism 50. For example, instead of the configuration in which the intermediate focus is used at the intermediate position including the beam splitter 36 (the present embodiment), the light path may be adjusted for collimated light collimated by the beam splitter 36.

In the present embodiment, the beam splitter 36 is disposed between the reflective mirror 35 and the low-magnification camera mechanism 40/the high-magnification camera mechanism 50, and includes a transmitted light exit surface that splits and transmits the formed projected image (light path), and a reflected light exit surface that reflects and splits the formed projected image (light path) by changing its direction. As the beam splitter 36, for example, it is possible to use a half-mirror coated mirror, a partially reflective mirror (partial mirror), or the like that transmits and reflects incident light at a certain ratio. By including such a beam splitter 36, the digital projector 30 according to the present embodiment is configured to simultaneously observe the same region (projected image) at different magnifications, using the low-magnification camera mechanism 40 and the high-magnification camera mechanism 50.

Moreover, as illustrated in FIG. 2, the digital projector 30 further includes a reflected-image light source 37 and a reflected-image beam splitter 34. The reflected-image light source 37 is, for example, a light source such as a light-emitting diode (LED), and is configured to perform irradiation with a light beam BM'. The reflected-image beam splitter 34 is disposed between the workpiece W/the grindstone 22 and the reflective mirror 35, and is configured to transmit the light beam BM from the main light source 32 toward the reflective mirror 35 and to reflect the light beam BM' from the reflected-image light source 37 toward the workpiece W and the grindstone 22. As the reflected-image beam splitter 34, for example, a half mirror or the like can be used. The reflected-image light source 37 and the reflected-image beam splitter 34 are configured to cooperate with each other to illuminate the workpiece W and the grindstone 22 from a direction (upward in the present embodiment) opposite to the irradiation direction of the main light source 32 (downward in the present embodiment), and form the reflected image from above the workpiece W (or either transmit and split or reflect and split the light path) in the beam splitter 36. Note that the reflected-image light source 37 and the reflected-image beam splitter 34 according to the present embodiment can adopt various known configurations, and a detailed description thereof will thus be omitted.

[Configuration of Low-Magnification Camera Mechanism]

The low-magnification camera mechanism 40 is configured to capture one of the projected image transmitted through and split by the beam splitter 36 and the projected image reflected and split by the beam splitter 36. Specifically, as illustrated in FIG. 2, the low-magnification camera mechanism 40 includes a low-magnification camera 42, and a low-magnification image-forming lens 44 that transmits the projected image transmitted through and split by the beam splitter 36 to the low-magnification camera 42. In the illustrated example, the low-magnification image-forming lens 44 and the low-magnification camera 42 are disposed to face the transmitted light exit surface of the beam splitter 36. However, the present invention is not limited thereto, and it is possible to make various placements, and also possible to add appropriate components such as reflecting means according to the placement.

The low-magnification image-forming lens 44 is configured to enlarge or reduce the projected image transmitted through and split by the beam splitter 36 at a predetermined magnification and to form an image of the enlarged or reduced projected image (low-magnification projected image) in the low-magnification camera 42. The low-magnification image-forming lens 44 may be a lens group made up of a plurality of lenses (low-magnification image-forming lens group). Any setting can be made for the magnification of the low-magnification image-forming lens 44 to an extent that the magnification can provide a relatively wide grasp of the machining range of the workpiece W. For example, the magnification can be set to a range of 0.3 times to 1 times the actual size of the workpiece W and the grindstone 22. Note that the magnification of the low-magnification image-forming lens 44 may be made optionally changeable by switching lenses or adding or reducing a lens to be used.

The low-magnification camera 42 is configured to capture the low-magnification projected image formed by the low-magnification image-forming lens 44. As the low-magnification camera 42, for example, a so-called 4K camera with a 4K resolution can be used, but the present invention is not limited thereto. As the low-magnification camera 42, it is possible to optionally employ various known imaging means, such as a complementary metal oxide semiconductor (CMOS) an image sensor, a charge-coupled device (CCD) image sensor, an array sensor, and a camera tube. The low-magnification camera 42 is connected to the projector control unit 60 in a wireless or wired manner to be capable of transferring data, and is configured to transfer the image data of the low-magnification projected image captured by the low-magnification camera 42 to the projector control unit 60 and display the image data as the low-magnification image LI on the display 31.

[Configuration of High-Magnification Camera Mechanism]

The high-magnification camera mechanism 50 is configured to capture the other of the projected image transmitted through and split by the beam splitter 36 and the projected image reflected and split by the beam splitter 36. Specifically, as illustrated in FIG. 2, the high-magnification camera mechanism 50 includes: a high-magnification image-forming lens 54 that enlarges the projected image reflected and split by the beam splitter 36 at a predetermined magnification; a high-magnification camera 52 that captures the projected image (high-magnification projected image) enlarged by the high-magnification image-forming lens 54;

and a high-magnification camera movement mechanism 57 that changes the imaging position of the high-magnification camera 52 with respect to the projected image reflected and split by the beam splitter 36 (the reflected light exit surface of the beam splitter 36).

The high-magnification camera mechanism 50 further includes a reflective mirror 56 that reflects the high-magnification projected image enlarged by the high-magnification image-forming lens 54 toward the high-magnification camera 52. In the illustrated example, the high-magnification image-forming lens 54 is disposed to face the reflected light exit surface of the beam splitter 36, and the high-magnification camera 52 is disposed in a direction orthogonal to the facing direction. However, the present invention is not limited thereto, and it is possible to make various placements, and also possible to add or remove the reflective mirror 56 depending on the placement.

The high-magnification image-forming lens 54 is configured to form the high-magnification projected image in the high-magnification camera 52 while enlarging the projected image reflected and split by the beam splitter 36 at a predetermined magnification. The high-magnification image-forming lens 54 may be a lens group made up of a plurality of lenses (high-magnification image-forming lens group). The magnification of the high-magnification image-forming lens 54 is set higher than the magnification of the low-magnification image-forming lens 44. For such a magnification, any setting can be made within a range enabling pinpoint grasping of the workpiece W. For example, the magnification can be set to a range of 5 times to 10 times the actual size of the workpiece W and the grindstone 22. Note that the high-magnification image-forming lens 54 may be made optionally changeable by switching lenses or adding or reducing a lens to be used.

The high-magnification camera 52 is configured to capture the high-magnification projected image enlarged and formed by the high-magnification image-forming lens 54. As the high-magnification camera 52, for example, a so-called 2K camera with a 2K resolution can be used, but the present invention is not limited thereto. As the high-magnification camera 52, it is possible to optionally employ various known imaging means, such as a complementary metal oxide semiconductor (CMOS) an image sensor, a charge-coupled device (CCD) image sensor, an array sensor, and a camera tube. The high-magnification camera 52 is connected to the projector control unit 60 in a wireless or wired manner to be capable of transferring data, and is configured to transfer the image data of the high-magnification projected image captured by the high-magnification camera 52 to the projector control unit 60 and display the image data as the high-magnification image HI on the display 31.

The high-magnification camera movement mechanism 57 is configured to change the imaging position of the high-magnification camera 52 according to the movement (change in display position) of the high-magnification image HI, which will be described later. Specifically, the high-magnification camera movement mechanism 57 is configured to change the imaging position of the high-magnification camera 52 with respect to the reflected light exit surface of the beam splitter 36 while maintaining the relative positional relationship among the high-magnification image-forming lens 54, the high-magnification camera 52, and the reflective mirror 56. More specifically, as illustrated in FIG. 3, the high-magnification camera movement mechanism 57 includes: a movable housing 58 configured to be relatively movable with respect to a fixed housing 11 in which the beam splitter 36 is incorporated; and an X-axis direction drive unit 59x (cf. FIG. 4) and a Y-axis direction drive unit 59y (cf. FIG. 4) that move the movable housing 58 in directions (X-axis direction and Y-axis direction in FIG. 3) orthogonal to the direction (Z-axis direction in FIG. 3) in which the reflected light exit surface of the beam splitter 36 and the high-magnification image-forming lens 54 face each other.

In addition to the beam splitter 36, the fixed housing 11 houses the relay lens 33, the reflective mirror 35, the reflected-image beam splitter 34, and the reflected-image light source 37 in an unmovable state relative to each other. The low-magnification camera mechanism 40 is incorporated in the fixed housing 11 in a state where the low-magnification camera mechanism 40 cannot move relative to the transmitted light exit surface of the beam splitter 36. However, the low-magnification camera mechanism 40 may be movable relative to the transmitted light exit surface of the beam splitter 36, that is, the imaging range of the projected image transmitted through the transmitted light exit surface of the beam splitter 36 and split may be changeable.

The high-magnification image-forming lens 54, the high-magnification camera 52, and the reflective mirror 56 are housed in the movable housing 58 in an unmovable state relative to each other. The movable housing 58 is configured to be relatively movable with respect to the reflected light exit surface of the beam splitter 36 incorporated in the fixed housing 11, and is thereby configured to change the imaging range of the high-magnification camera 52 with respect to the projected images reflected and split by the beam splitter 36.

The X-axis direction drive unit 59x is configured to move the movable housing 58 with respect to the fixed housing 11 along the X-axis direction (a first direction orthogonal to the direction in which the reflected light exit surface of the beam splitter 36 and the high-magnification image-forming lens 54 face each other) based on an X-axis direction movement command output in response to the operator's operation instruction. The Y-axis direction drive unit 59y is configured to move the movable housing 58 with respect to the fixed housing 11 along the Y-axis direction (the direction in which the reflected light exit surface of the beam splitter 36 and the high-magnification image-forming lens 54 face each other and the direction orthogonal to the first direction) based on a Y-axis direction movement command output in response to the operator's operation instruction. Note that the X-axis direction drive unit 59x and the Y-axis direction drive unit 59y according to the present embodiment can adopt various known configurations, and a detailed description thereof will thus be omitted.

[Configuration of Display]

The display 31 has a display area capable of displaying the low-magnification image LI captured by the low-magnification camera mechanism 40 and the high-magnification image HI captured by the high-magnification camera mechanism 50. The display area of the display 31 is formed of a touch panel capable of receiving the operator's operation instruction. Note that the display 31 is not limited to a touch panel, and various arbitrary configurations such as a liquid crystal display can be adopted. The display 31 is a built-in display fixed to the main body of the digital projector 30. However, the display 31 is not limited thereto, and may be a remote-controlled display installed at a position separate from the main body of the digital projector 30, or may be a portable display such as a tablet terminal, for example. Furthermore, examples of the operator's operation include various operations to the touch panel, such as touching, swiping, pinch-to-zoom in, and pinch-to-zoom out. However, the operator's operation is not limited thereto, and may be operation means (e.g., a mouse, a keyboard, a jog wheel, etc.) provided separately from the display 31.

[Configuration of Projector Control Unit]

As illustrated in FIG. 4, the projector control unit 60 includes: a screen display processing unit 62 that controls the screen display processing of the display 31; a drive processing unit 64 that controls the high-magnification camera movement mechanism 57 in response to the operator's operation instruction; and a storage unit 66 that stores various information and programs for causing the projector control unit 60 to operate. Specifically, the projector control unit 60 includes a central processing unit (CPU), which is a hardware processor, random-access memory (RAM), read-only memory (ROM), and the like, and is configured to achieve the respective functions of the screen display processing unit 62 and the drive processing unit 64 by loading the program stored in the storage unit 66 into the RAM, and interpreting and executing the program by the CPU.

The screen display processing unit 62 is configured to simultaneously display the low-magnification image LI captured by the low-magnification camera mechanism 40 and the high-magnification image HI captured by the high-magnification camera mechanism 50 on the display 31. Specifically, the screen display processing unit 62 is configured to perform a pre-processing such as inversion processing as necessary on the image data acquired from the low-magnification camera mechanism 40, and then execute a process of displaying the pre-processed image data as the low-magnification image LI, enlarged over substantially the entire area of the display 31. Also, the screen display processing unit 62 is configured to perform pre-processing such as inversion processing as necessary on the image data acquired from the high-magnification camera mechanism 50, and then execute a process of displaying the pre-processed image data as the high-magnification image HI, enlarged in a part of the display 31.

Here, the low-magnification image LI is an image that displays the projected image transmitted through and split by the beam splitter 36 at a predetermined magnification, and the high-magnification image HI is an image that displays a part of the projected image reflected and split by the beam splitter 36 at a magnification higher than the low-magnification image LI. The aspect ratio of the window for displaying the low-magnification image LI may be the same as or different from the aspect ratio of the window for displaying the high-magnification image HI. Moreover, the aspect ratios of the respective windows for displaying the low-magnification image LI and the high-magnification image HI may be the same as or different from the aspect ratio of the display area of the display 31.

The screen display processing unit 62 is configured to display the low-magnification image LI and the high-magnification image HI on the display 31 in an overlapping manner. Specifically, as illustrated in FIG. 5, the screen display processing unit 62 is configured to align the low-magnification image LI with the high-magnification image HI at a predetermined reference point, and display the high-magnification image HI on the low-magnification image LI in an overlapping manner. The reference point in this case is, for example, the center (0,0) of the low-magnification image LI and the center (0,0) of the high-magnification image HI. However, the reference point is not limited thereto, and may be corner portions or the like of the low-magnification image LI and the high-magnification image HI. The screen display processing unit 62 converts the coordinate position (mechanical coordinate position) of the high-magnification camera movement mechanism 57 into a coordinate position on the display 31 (on-screen coordinate position) and displays the high-magnification image HI at the converted on-screen coordinate position, whereby the high-magnification image HI can be displayed on the corresponding portion of the low-magnification image LI. That is, as illustrated in FIG. 4, the screen display processing unit 62 is configured to display the high-magnification image HI, which indicates the shape (high-magnification projected image) of a part of the low-magnification projected image indicated by the low-magnification image LI, in an overlapping manner on the part of the low-magnification projected image. Note that the screen display processing unit 62 may be configured to switch between display and undisplay of the high-magnification image HI by the operator's operation. The screen display processing unit 62 may be configured to change the display size of the high-magnification image HI.

Further, the screen display processing unit 62 is configured to display machining support image data (e.g., line drawing trace data) previously stored in the storage unit 66 so as to be superimposed on the low-magnification image LI and the high-magnification image HI. Specifically, the screen display processing unit 62 is configured to display, on the low-magnification image LI, machining support image data corresponding to the low-magnification projected image of the low-magnification image LI at the same magnification as the low-magnification projected image, and is configured to display, on the high-magnification image HI, machining support image data corresponding to the high-magnification projected image of the high-magnification image HI at the same magnification as the high-magnification projected image. Examples of the machining support image data as thus described include a chart illustrating a desired shape (shape to be ground) of the workpiece W (object to be machined). However, the machining support image data is not limited thereto, and may be various template figures such as straight line figures and arc figures.

The screen display processing unit 62 is configured to execute a process of enlarging or reducing the low-magnification image LI and the high-magnification image HI on the display 31 by the operator's operation. Moreover, the screen display processing unit 62 is configured to enlarge or reduce the machining support image data at the same magnification in conjunction with the enlargement or reduction of the low-magnification image LI and the high-magnification image HI. Note that the screen display processing unit 62 may be capable of executing a process of enlarging or reducing the low-magnification image LI and the high-magnification image HI independently of each other, and instead of or along with this, the screen display processing unit 62 may be capable of executing a process of enlarging or reducing the low-magnification image LI and the high-magnification image HI in conjunction with each other. Examples of such an enlargement or reduction operation include, but are not limited to, an operation through touching and the like of an enlargement button and a reduction button displayed on the display 31, and an operation such as pinch-to-zoom in, and pinch-to-zoom out on the low-magnification image LI and the high-magnification image HI on the display 31.

Furthermore, the screen display processing unit 62 is configured to change the display position of the high-magnification image HI on the display 31. Specifically, the screen display processing unit 62 is configured to execute a process of moving the high-magnification image HI on the display 31 by the operator's operation. The screen display processing unit 62 is configured to move the machining support image data in conjunction with the movement of the high-magnification image HI by the same distance. As illustrated in FIG. 5, the movement range of the high-magnification image HI can be, but is not limited to, a range in which the center (0,0) of the high-magnification image HI does not exceed the four corners of the low-magnification image LI. The movement range of the high-magnification image HI (the movable range of the high-magnification camera movement mechanism 57) may be the same as or different from the aspect ratio of the display area of the display 31.

Note that the screen display processing unit 62 may be configured to execute a process of moving the low-magnification image LI within the display 31 by the operator's operation, and in this case, the screen display processing unit 62 may be capable of executing a process of moving the high-magnification image HI and the machining support image data on the display 31 in conjunction with the movement of the low-magnification image LI. The screen display processing unit 62 may be configured to switch between an interlocking movement mode in which another image or image data is moved in association with the movement target (the high-magnification image HI, the low-magnification image LI, or the machining support image data) and an independent movement mode in which each element is moved independently. Examples of the movement operation as thus described include a swiping operation on the display 31. However, the movement operation is not limited thereto, and may be executed by an operation of touching a moving destination, an operation of touching a movement operation button displayed on the display 31, an operation using operation means (e.g., a mouse, a keyboard, a jog wheel, etc.) provided separately from the display 31, or the like.

The screen display processing unit 62 may be configured to execute a process of moving the low-magnification image LI, the high-magnification image HI, and the machining support image data on the display 31 in conjunction with the movement of the workpiece W by the workpiece holding mechanism 10. Specifically, the screen display processing unit 62 may be configured to acquire the coordinate position of the workpiece W from the workpiece holding mechanism 10, calculate the movement amount of the workpiece W, convert the movement amount into the movement amount on the display 31 based on a predetermined set magnification, and move the low-magnification image LI, the high-magnification image HI, and the machining support image data based on the converted movement amount.

In addition to the various processes described above, the screen display processing unit 62 may be configured to also execute a process such as: a process of displaying and adjusting auxiliary lines (cross lines and extension lines displayed in curvilinear portions of a chart) with respect to a chart; a process of displaying concentric circles necessary for aligning the position of the grindstone; a process of measuring the shape of the workpiece W (e.g., a distance between any two points, a straight line angle, an arc radius, a step distance, a pitch, an amount of difference with respect to computer-aided design (CAD) data, etc.); a process of measuring the tip shape of the grindstone transferred to a dummy workpiece or the like; a process of simulating a grindstone movement path in a machining program and displaying the simulation on the actual image (the low-magnification image LI and the high-magnification image HI) in an overlapping manner; or a process of correcting the machining program.

Moreover, the screen display processing unit 62 may be configured to execute a process of automatically measuring the shape of the workpiece W using a measurement position previously designated by computer-aided design (CAD) data (automatic workpiece shape measurement processing). The screen display processing unit 62 may be configured to display the result of the automatic workpiece shape measurement processing on the display 31 simultaneously with the low-magnification image LI, the high-magnification image HI, the chart, and the like. The result of the automatic workpiece shape measurement processing may be performed, for example, by a method of visually displaying the dimensional difference between the measured dimensions of the workpiece contour and the desired shape, which is the finished shape. In this case, the allowable tolerance may be visually displayed simultaneously with the dimensional difference. The displaying of the allowable tolerance as thus described is exemplified by a method of simultaneously displaying an inner allowable tolerance chart illustrating an allowable shape on the minus side (the inside of the workpiece W) and an outer allowable tolerance chart illustrating an allowable shape on the plus side (the outside of the workpiece W) with reference to the outline of the desired shape. With such a configuration, double frame lines are formed and displayed by the inner allowable tolerance chart (inner frame line) and the outer allowable tolerance chart (outer frame line), and the range of the allowable tolerance is between these double frame lines. Therefore, it is possible to easily determine whether or not the result of the automatic workpiece shape measurement processing is within the allowable tolerance only by visually confirming whether or not the dimensional difference as a measurement result falls between the double frame lines. Note that the screen display processing unit 62 may be configured to read and display the past result stored in the storage unit 66.

The drive processing unit 64 is configured to control the high-magnification camera movement mechanism 57 in response to the movement operation of the high-magnification image HI by the operator. Specifically, the drive processing unit 64 is configured to convert, upon an input of a movement command operation of the high-magnification image HI by the operator, an operation movement amount (a movement amount of on-screen coordinates) of the high-magnification image HI on the display 31 into an X'Y'-axis movement amount (a movement amount of mechanical coordinates) of the high-magnification camera movement mechanism 57. The drive processing unit 64 is configured to execute a process of driving the X-axis direction drive unit 59x and the Y-axis direction drive unit 59y of the high-magnification camera movement mechanism 57 based on the converted X'Y'-axis movement amount, and also capturing the high-magnification image HI with the high-magnification camera 52. The screen display processing unit 62 is configured to redisplay the high-magnification image HI captured on the display 31 in this manner and thus execute the movement process for the high-magnification image HI described above. Examples of the conversion in this case include, but are not limited to, a conversion method in which the relative amount on the touch panel is multiplied by a conversion coefficient. The drive processing unit 64 may cause the high-magnification image HI to be captured in real time during the movement of the high-magnification camera movement mechanism 57, or may cause the high-magnification image HI to be captured after the movement of the high-magnification camera movement mechanism 57.

With the configuration described above, the digital projector 30 can grind the workpiece W so that the shapes of the low-magnification image LI and the high-magnification image HI match, while simultaneously viewing these images. The digital projector 30 is configured to simultaneously project the projected image of the grindstone 22 and the machining support image data such as a chart on the display 31 and teach (measure and register) the position of the grindstone along the contour of the chart, even during the creation of a machining program using the teaching playback method.

[Projected Image Display Method]

Figure 6:
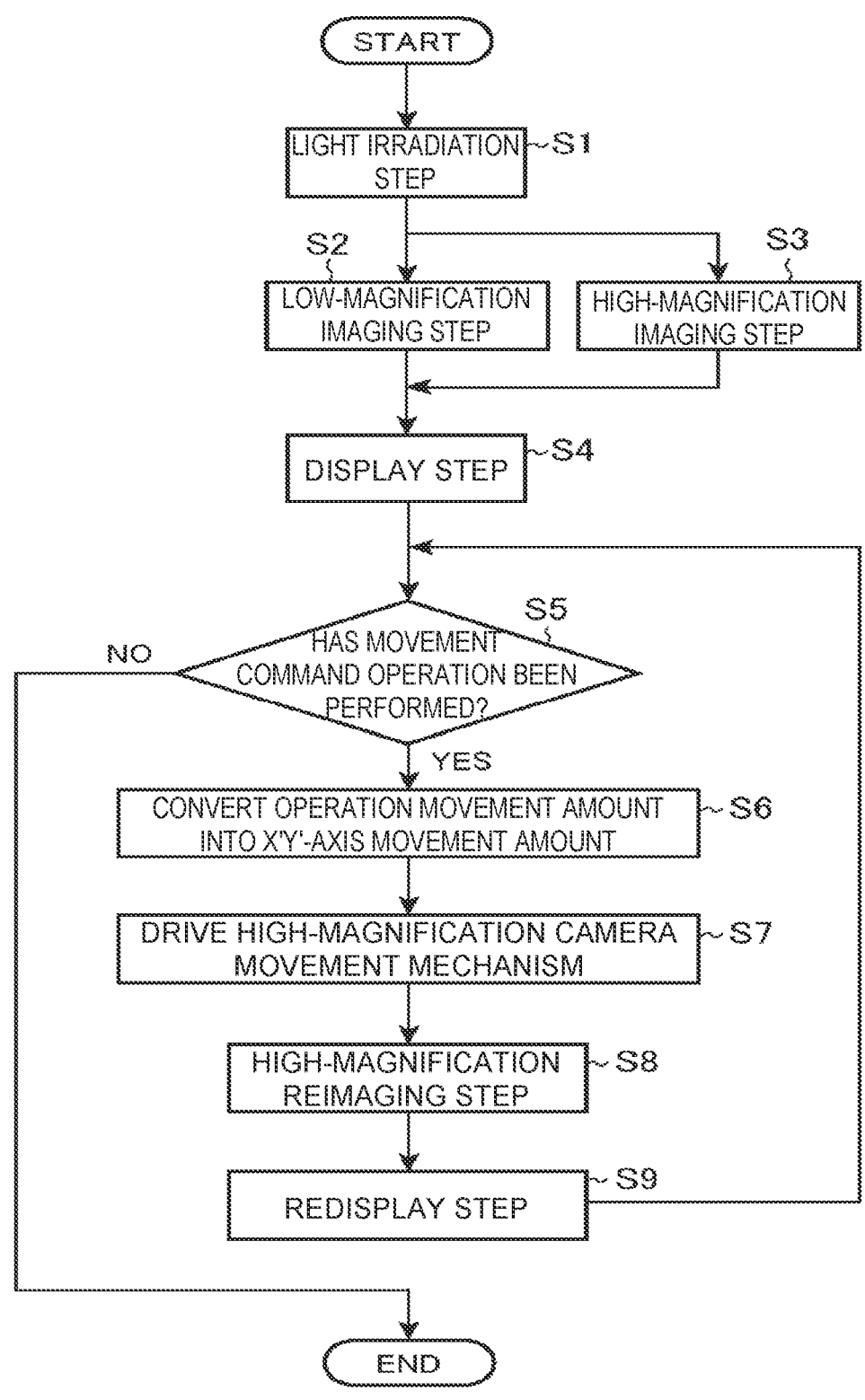
FIG. 6 is a flowchart illustrating an example of a projected image display method according to the present embodiment.

Next, a projected image display method using the digital projector 30 according to the present embodiment will be described with reference to FIG. 6. FIG. 6 is a flowchart illustrating an example of the projected image display method according to the present embodiment.

The projected image display method according to the present embodiment includes in outline: irradiating the workpiece W (object to be machined) with the light beam BM (light) (S1); capturing a projected image of the workpiece W, generated by the light irradiation step, with the low-magnification camera mechanism 40 (S2); capturing the projected image, split by the beam splitter 36, with the high-magnification camera mechanism 50 in a range narrower than the low-magnification camera mechanism 40 and at a magnification higher than the low-magnification camera mechanism 40 (S3); and displaying, on the display 31, the low-magnification image LI captured by the low-magnification imaging step (S2) and the high-magnification image HI captured by the high-magnification imaging step (S3) (S4).

Specifically, first, when the power is turned on by the operator, the main light source 32 performs irradiation with the light beam BM (light) (S1: light irradiation step). This creates a shadow of the workpiece W and the grindstone 22, and the shadow is transmitted through and split or reflected and split by the beam splitter 36 via the relay lens 33 and the reflective mirror 35, and then formed into an image, resulting in the formation of the projected image of the workpiece W and the grindstone 22. In the projected image display method according to the present embodiment, the reflected-image light source 37 and the reflected-image beam splitter 34 also cause the reflected image from above the workpiece W and the grindstone 22 to be transmitted through and split by or reflected and split by the beam splitter 36.

Next, the low-magnification camera mechanism 40 is activated, and the low-magnification camera mechanism 40 captures the projected image transmitted through and split by the beam splitter 36 (S2: low-magnification imaging step). In parallel with the low-magnification imaging step (S2), the high-magnification camera mechanism 50 is activated, and the high-magnification camera mechanism 50 captures the projected image reflected and split by the beam splitter 36. (S3: high-magnification imaging step).

Then, the image data captured in the low-magnification imaging step (S2) and the image data captured in the high-magnification imaging step (S3) are each transferred to the screen display processing unit 62 and subjected to predetermined pre-processing. The image data captured in the low-magnification imaging step (S2) is displayed as the low-magnification image LI over substantially the entire area of the display 31, and the image data captured in the high-magnification imaging step (S3) is displayed as the high-magnification image HI on a part of the display 31 (S4: display step).

This makes it possible to observe a wide range (e.g., the entire area) of the projected image using the low-magnification image LI, and also observe the details of the workpiece and measure the shape and dimension of the workpiece by displaying a more pinpoint range in the projected image in an enlarged manner at a high magnification, using the high-magnification image HI. In the projected image display method according to the present embodiment, the machining support image data described above can be displayed on the display 31 along with the low-magnification image LI and the high-magnification image HI.

In the projected image display method according to the present embodiment, in a state where the low-magnification image LI and the high-magnification image HI are simultaneously displayed on the display 31, when it is detected that the display position of the high-magnification image HI has been changed by the operator's operation (YES in S5), the operation movement amount (a movement amount of on-screen coordinates) of the high-magnification image HI on the display 31 is converted into an X'Y'-axis movement amount (a movement amount of mechanical coordinates) of the high-magnification camera movement mechanism 57 (S6), the high-magnification camera movement mechanism 57 is moved based on the converted X'Y'-axis movement amount (S7), and the high-magnification camera mechanism 50 recaptures the projected image reflected and split by the beam splitter 36. (S8: high-magnification reimaging step). Then, the image data recaptured in the high-magnification reimaging step (S8) is transferred to the screen display processing unit 62, and after predetermined pre-processing is performed, the image data recaptured in the high-magnification reimaging step (S8) is displayed as the high-magnification image HI instead of the high-magnification image HI captured in the high-magnification imaging step (S3) (S9: redisplay step).

Thereafter, when the display position of the high-magnification image HI is changed again by the operator's operation, the processes of S6 to S9 are executed repeatedly. On the other hand, when the display position of the high-magnification image HI is not changed by the operator's operation (NO in S5), the simultaneous display of the low-magnification image LI and the high-magnification image HI is continued. When the operator performs an operation, such as an operation for undisplaying the high-magnification image HI, an operation for enlarging and reducing the low-magnification image LI and high-magnification image HI, or an operation for displaying the machining support image data, screen display processing is appropriately performed according to the operation performed. When a series of grinding machining, workpiece shape measurement, teaching, and the like are completed, the power is turned off by the operator, and a series of processes of the projected image display method is completed.

[Advantages of Digital Projector According to Present Embodiment]

As described above, the digital projector 30 according to the present embodiment includes: a main light source 32 (light source) such as a light-emitting diode (LED) that irradiates a the workpiece W (object to be machined), with a light beam BM (light); a low-magnification camera mechanism 40 that captures a projected image of the workpiece W generated by the irradiation by the main light source 32; a beam splitter 36 provided on a light path of the projected image; a high-magnification camera mechanism 50 that captures the projected image of the workpiece W, split by the beam splitter 36, in a range narrower than the low-magnification camera mechanism 40 and at a magnification higher than the low-magnification camera mechanism 40; and a display 31 that displays a low-magnification image LI captured by the low-magnification camera mechanism 40 and a high-magnification image HI captured by the high-magnification camera mechanism 50.

The digital projector 30 with such a configuration has an advantage that a wide range (e.g., the whole) of the projected image obtained by enlarging the workpiece W and/or the grindstone 22 at a low magnification can be observed using the low-magnification image LI captured by the low-magnification camera mechanism 40, and the details of the workpiece can be observed and the shape and dimension of the workpiece can be measured by displaying a more pinpoint range in the projected image of the workpiece W in an enlarged manner at a high magnification, using the high-magnification image HI captured by the high-magnification camera mechanism 50.

In particular, in the digital projector 30 according to the present embodiment, the low-magnification image LI and the high-magnification image HI are separately acquired by two sets of camera mechanisms, that is, the low-magnification camera mechanism 40 and the high-magnification camera mechanism 50, thus enabling the high-magnification image HI to be displayed with high resolution, so that it is possible to perform highly accurate measurement in microns. Further, in the digital projector 30 according to the present embodiment, the entire shape of the workpiece W can be grasped using the low-magnification image LI, and a part of the workpiece W can be observed in an enlarged manner using the high-magnification image HI, so that even an unskilled person can easily determine the shape and dimensions of the workpiece. Moreover, in the digital projector 30 according to the present embodiment, with the low-magnification image LI and the high-magnification image HI being displayed on the display 31, it is possible to achieve a grinder having highly functional added values such as image measurement and machining support.

As described above, in the digital projector 30 according to the present embodiment, the high-magnification camera mechanism 50 includes the high-magnification image-forming lens 54 that enlarges the projected image at a predetermined magnification, the high-magnification camera 52 that captures the enlarged projected image, and the high-magnification camera movement mechanism 57 that changes the imaging position of the high-magnification camera 52 with respect to the projected image. With such a digital projector 30, the imaging position of the high-magnification image HI on the projected image is changeable, thus making it possible to display any position of the projected image as the high-magnification image HI.

Moreover, as described above, the digital projector 30 according to the present embodiment is configured to change the display position of the high-magnification image HI on the display 31, and the high-magnification camera movement mechanism 57 is configured to change the imaging position of the high-magnification camera 52 according to a change in the display position of the high-magnification image HI. With such a digital projector 30, the imaging position of the high-magnification camera 52 can be changed by an intuitive operation of changing the display position of the high-magnification image HI on the display 31, thus improving operability.

As described above, in the digital projector 30 according to the present embodiment, an intermediate focus is formed on the light path between the workpiece W (object to be machined) and the low-magnification camera mechanism 40 and/or the high-magnification camera mechanism 50, the low-magnification camera mechanism 40 is configured to capture the projected image transmitted through or reflected by (in the above example, transmitted through) and split by the beam splitter 36, and the high-magnification camera mechanism 50 is configured to capture the projected image transmitted through or reflected by (in the above example, reflected by) and split by the beam splitter 36. With such a digital projector 30, the working distance above the workpiece W can be increased by the relay lens 33, and the optical configuration upstream of the beam splitter 36 can be shared by the low-magnification camera mechanism 40 and the high-magnification camera mechanism 50, so that equipment costs can be reduced, and the low-magnification camera mechanism 40 and the high-magnification camera mechanism 50 can more reliably perform simultaneous observation of the same region (the same projected image before being split by the beam splitter 36) at different magnifications.

Furthermore, as described above, the digital projector 30 according to the present embodiment is configured to display the low-magnification image LI and the high-magnification image HI on the display 31 in an overlapping manner. Such a digital projector 30 has an advantage that the position of the high-magnification image HI on the low-magnification image LI can be visually understood more easily than in a case where the low-magnification image LI and the high-magnification image HI are displayed at separate positions. Such an advantage is particularly remarkable when, on a part of the low-magnification projected image indicated by the low-magnification image LI, the high-magnification image HI indicating the shape of the part of the low-magnification projected image (high-magnification projected image) is displayed in an overlapping manner.

[Modifications]

While the preferred embodiment of the present invention has been described above, the technical scope of the present invention is not limited to the scope described in the embodiment described above. Various modifications or improvements can be made to the embodiment described above.

For example, in the embodiment described above, it has been described that the high-magnification camera mechanism 50 includes the high-magnification image-forming lens 54, the high-magnification camera 52, and the high-magnification camera movement mechanism 57. However, the present invention is not limited thereto, and the high-magnification camera movement mechanism 57 may not be provided.

In the embodiment described above, it has been described that the imaging position of the high-magnification camera 52 is changed according to a change in the display position of the high-magnification image HI on the display 31. However, the present invention is not limited thereto, and the imaging position of the high-magnification camera 52 may be changed by operating the high-magnification camera movement mechanism 57 by an operation using a jog wheel. In this case, the display position of the high-magnification image HI on the display 31 may be changed according to a change in the imaging position of the high-magnification camera 52.

In the embodiment described above, it has been described that the low-magnification camera mechanism 40 captures one of the projected image transmitted through and split by the beam splitter 36 and the projected image reflected and split by the beam splitter 36, and the high-magnification camera mechanism 50 captures the other projected image. However, the present invention is not limited thereto, and various configurations can be adopted as long as the high-magnification camera mechanism 50 can capture the projected image in a range narrower than the low-magnification camera mechanism 40 and at a magnification higher than the low-magnification camera mechanism 40. For example, the optical configuration for transmitting the projected image of the workpiece W (object to be machined) to the low-magnification camera mechanism 40 and the optical configuration for transmitting the projected image of the workpiece W (object to be machined) to the high-magnification camera mechanism 50 may be provided independently of each other.

Figure 7:
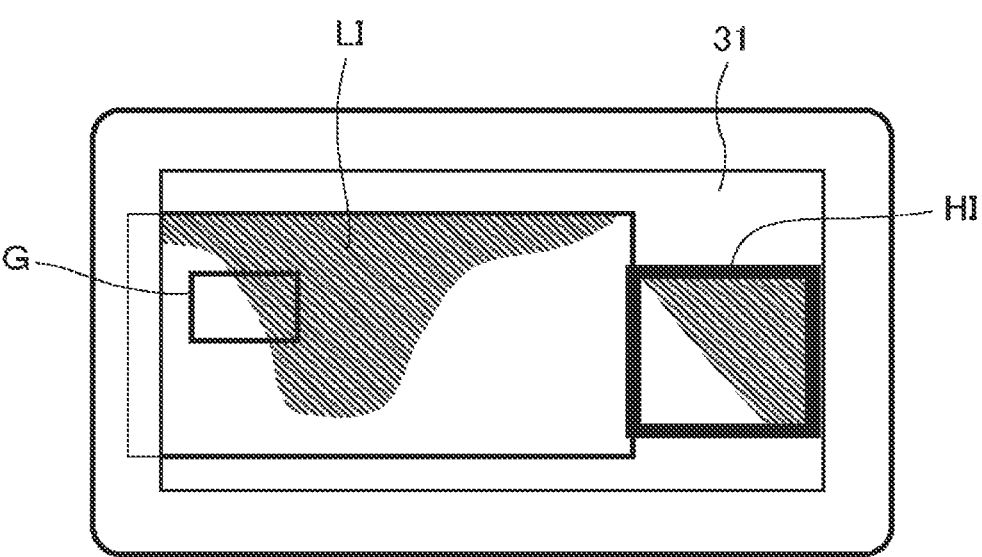
FIG. 7 illustrates a schematic view of an example of another display mode of a low-magnification image and a high-magnification image.

In the embodiment described above, it has been described that the low-magnification image LI and the high-magnification image HI are displayed on the display 31 in an overlapping manner. However, the present invention is not limited thereto, and for example, as illustrated in FIG. 7, the low-magnification image LI and the high-magnification image HI may be displayed side by side without overlapping with each other, or the low-magnification image LI and the high-magnification image HI may be displayed on different displays. In these cases, for example, as illustrated in FIG. 7, a guide frame line G may be made displayable to indicate which portion of the low-magnification projected image of the low-magnification image LI is the portion indicated by the high-magnification image HI.

In the embodiment described above, it has been described that the machine tool is the optical profile grinder 1. However, the present invention is not limited thereto, and various machine tools can be used as long as the machine tool is equipped with a digital projector.

It is obvious from the descriptive content in the claims that the modifications as described above are included in the scope of the present invention.

REFERENCE SIGNS LIST

1 optical profile grinder
10 workpiece holding mechanism
20 grindstone holding mechanism
22 grindstone
30 digital projector
31 display
32 main light source
33 relay lens
34 reflected-image beam splitter
35 reflective mirror
36 beam splitter
37 reflected-image light source
40 low-magnification camera mechanism
42 low-magnification camera
44 low-magnification image-forming lens
50 high-magnification camera mechanism
52 high-magnification camera
54 high-magnification image-forming lens
56 reflective mirror
57 high-magnification camera movement mechanism
58 movable housing
59$x$ X-axis direction drive unit
59$y$ Y-axis direction drive unit
60 projector control unit
62 screen display processing unit
64 drive processing unit
66 storage unit
70 operation control panel
BM, BM' light beam
G guide frame line
HI high-magnification image
LI low-magnification image
W workpiece

The invention claimed is:

1. A digital projector comprising:
   a light source configured to irradiate an object to be machined with light;
   a low-magnification camera mechanism configured to capture a projected image of the object to be machined, generated by the irradiation by the light source;
   a beam splitter provided on a light path of the projected image;
   a high-magnification camera mechanism configured to capture the projected image, split by the beam splitter, in a range narrower than the low-magnification camera mechanism and at a magnification higher than the low-magnification camera mechanism; and
   a display configured to display a low-magnification image captured by the low-magnification camera mechanism and a high-magnification image captured by the high-magnification camera mechanism, wherein
   the high-magnification camera mechanism includes
   a high-magnification image-forming lens configured to enlarge the projected image to a predetermined magnification,
   a high-magnification camera configured to capture the projected image enlarged, and
   a high-magnification camera movement mechanism configured to change an imaging position of the high-magnification camera with respect to the projected image,
   a display position of the high-magnification image on the display is changeable, and
   the high-magnification camera movement mechanism is configured to change the imaging position of the high-magnification camera in accordance with a change in the display position of the high-magnification image and is configured to be able to move the imaging position of the high-magnification camera relatively with respect to the low-magnification camera mechanism.

2. The digital projector according to claim 1, wherein
   an intermediate focus is formed on a light path between the object to be machined and the low-magnification camera mechanism and/or the high-magnification camera mechanism,
   the low-magnification camera mechanism is configured to capture one of a projected image transmitted through and split by the beam splitter and a projected image reflected and split by the beam splitter, and
   the high-magnification camera mechanism is configured to capture the other of the projected image transmitted through and split by the beam splitter and the projected image reflected and split by the beam splitter.

3. The digital projector according to claim 1, wherein the low-magnification image and the high-magnification image are displayable in an overlapping manner on the display.

4. A machine tool comprising
   the digital projector according to claim 1.

5. A projected image display method using the digital projector according to claim 1, the projected image display method comprising:
   irradiating an object to be machined with light;

capturing a projected image of the object to be machined, generated by the light irradiation step, with the low-magnification camera mechanism;

capturing the projected image, split by the beam splitter, with the high-magnification camera mechanism in a range narrower than the low-magnification camera mechanism and at a magnification higher than the low-magnification camera mechanism; and displaying, on the display, a low-magnification image captured by the low-magnification imaging step and a high-magnification image captured by the high-magnification imaging step.

\* \* \* \* \*